(Model.) 2 Sheets—Sheet 1.
O. DAVIS.
Separator for Grain, &c.
No. 238,030. Patented Feb. 22, 1881.
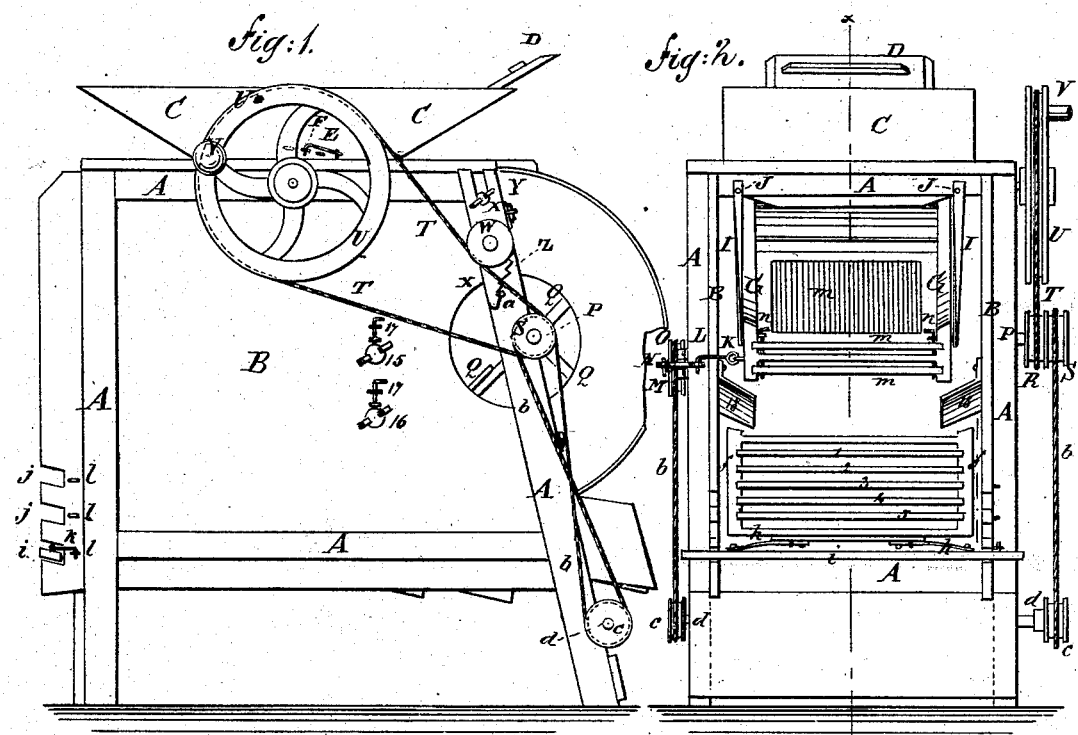
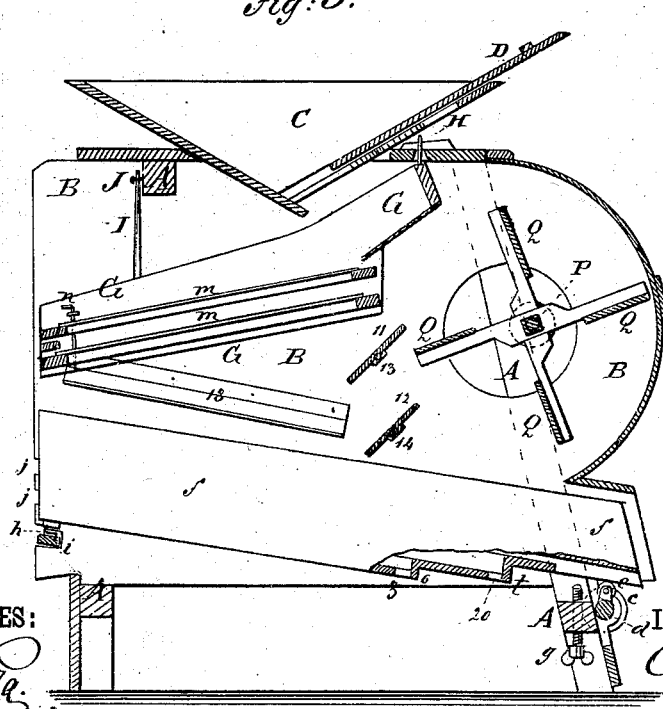
WITNESSES:
Chas. Nida.
C. Sedgwick
INVENTOR:
O. Davis
BY Munn & Co.
ATTORNEYS.

(Model.)

2 Sheets—Sheet 2.

O. DAVIS.
Separator for Grain, &c.

No. 238,030. Patented Feb. 22, 1881.

WITNESSES:
Chas. Nidd.
C. Sedgwick.

INVENTOR:
O. Davis
BY Munn & Co
ATTORNEYS.

UNITED STATES PATENT OFFICE.

OWEN DAVIS, OF SULLIVAN, INDIANA.

SEPARATOR FOR GRAIN, &c.

SPECIFICATION forming part of Letters Patent No. 238,030, dated February 22, 1881.

Application filed September 13, 1880. (Model.)

*To all whom it may concern:*

Be it known that I, OWEN DAVIS, of Sullivan, in the county of Sullivan and State of Indiana, have invented a new and useful Improvement in Cleaners and Separators for Grain and Grass-Seeds, of which the following is a specification.

Figure 4:
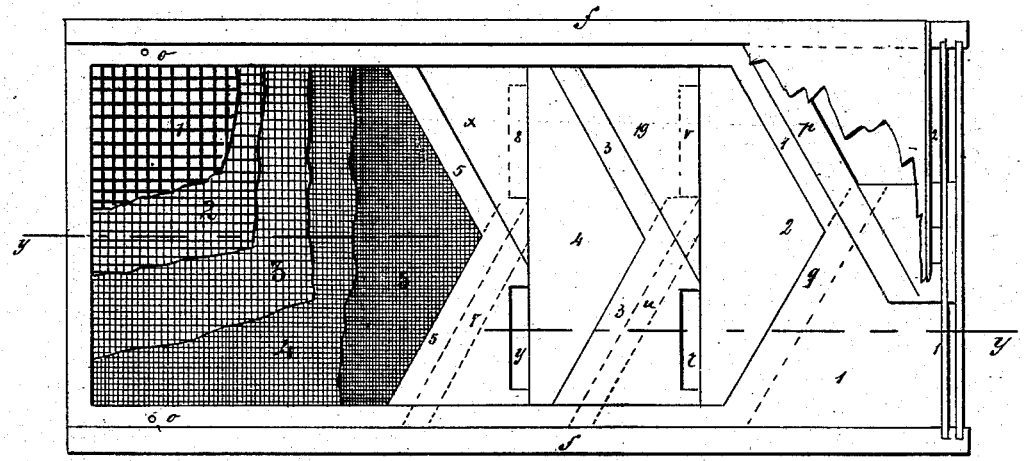
Figure 5:
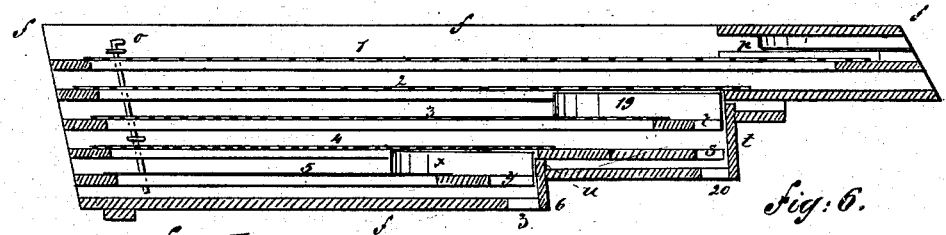
Figures 6, 7:
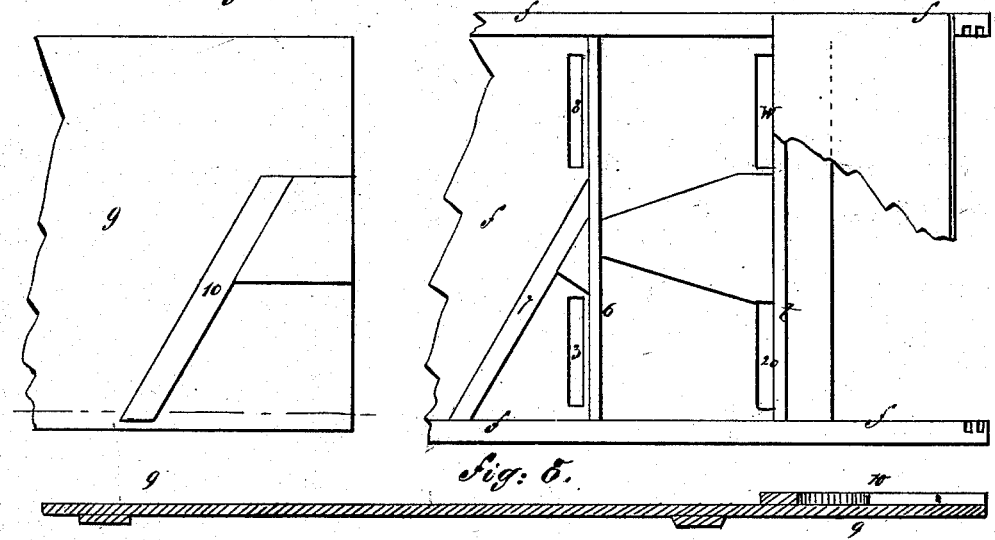

Figure 1, Sheet 1, is a side elevation of the improvement. Fig. 2, Sheet 1, is a rear elevation. Fig. 3, Sheet 1, is a sectional side elevation taken through the line $xx$, Fig. 2. Fig. 4, Sheet 2, is a plan view of the lower shoe and its screens, parts being broken away. Fig. 5, Sheet 2, is a sectional side elevation taken through the line $yy$, Fig. 4. Fig. 6, Sheet 2, is a plan view of the lower part of the lower shoe, part being broken away. Fig. 7, Sheet 2, is a plan view of the lower part of the division-board. Fig. 8, Sheet 2, is a longitudinal section of the division-board.

The object of this invention is to furnish cleaners and separators for grain and grass-seeds so constructed as to drive off the chaff and straw, separate the larger and smaller kernels of wheat, separate the split kernels of wheat, and the cockle and cheat from the grain, separate red clover-seed, timothy-seed, and red-top seed from the grain and from each other, and to separate the larger kernels of oats from the smaller kernels.

A represents the frame of the machine, and B the casing. In an opening in the top of the machine is placed the hopper C, which is provided with a sliding gate, D, to regulate the rapidity at which the uncleaned grain and seed are fed to the machine. The hopper can be tilted forward or rearward to regulate the part of the riddles upon which the uncleaned grain and seed are deposited, and is held in place, when adjusted, by hooks E, hinged to the top of the machine, and which hook into one or another of the staples F, attached to the sides of the hopper C.

G is the upper shoe, which inclines downward toward the rear end of the machine, and is hung at the center of its upper end from the top of the machine by a staple and key, H, or other suitable means, so that its lower end can have a lateral movement.

To the sides of the lower end of the shoe G are attached the lower ends of two straps, I, the upper ends of which have holes formed in them to receive pins or hooks J, attached to the forward cross-bar of the frame A, so as to support the lower ends of the shoe G without interfering with its lateral movement.

To one side of the lower part of the shoe G is hinged a hook, K, which passes through an aperture in the side casing, B, of the machine, and hooks into a hole in the arm of the elbow-lever L. The elbow-lever L is pivoted at its angle to supports attached to a post of the frame A. Into a hole in the other arm of the elbow-lever L is hooked a hook formed upon the forward end of the rod M, the rear end of which is pivoted to a crank-pin, N, attached to the pulley O. The pulley O is attached to the end of the shaft P, which revolves in bearings attached to the front posts of the frame A, and to which the fans Q are attached. To the other end of the fan-shaft P is attached a double pulley, R S, around the inner part, R, of which passes a belt, T. The belt T passes around a large pulley, U, pivoted to a gudgeon attached to the top side bar of the frame A. To the pulley U is attached a crank-pin, V, which serves as a handle in operating the machine. The tension of the belt T is regulated by a pulley, W, pivoted to a bar, X, which rests against the forward post of the frame A. The upper end of the bar X is slotted to receive the hand-screw Y, by which it is clamped against the post of the frame.

Upon the forward edge of the lower part of the bar X is formed a series of shoulders, Z, to rest against a pin, $a$, attached to the post of the frame A, so that as the bar X is moved up or down, to bring one or another of its shoulders Z against the pin $a$, the pulley W will be moved toward or from the belt T, to tighten or slacken the said belt, as required.

Around the outer part, S, of the double pulley attached to one end of the fan-shaft P, and around the pulley O, attached to the other end of the said fan-shaft P, pass the belts $b$, which also pass around the pulleys $c$, attached to the ends of the shaft $d$. The shaft $d$ revolves in bearings attached to the outer sides of the lower parts of the forward posts of the frame A, and to the said shaft $d$, at the inner sides of the side casings, B, are attached two pairs of lugs, to each pair of which is pivoted a small roller, e. At each revolution of the shaft d the rollers e come in contact with the lower edges of the sides of the lower or forward end of the lower shoe, f, and raise it. As the rollers e pass down from the shoe f, the said shoe descends until the lower edges of its sides come in contact with and rest upon the ends of the set-screws g, which pass up through a cross-bar of the frame A. With this construction the lower shoe, f, receives a vertical vibration from the revolution of the shaft d, and the amount of such vibration is regulated by adjusting the set-screws g.

To the rear or upper end of the lower shoe, f, are attached the ends of two springs, h, the other ends of which are attached to the cross-bar i, that supports the upper end of the shoe f. The end parts of the cross-bar i are inserted in notches j in the rear ends of the side casings, B, and are secured in place by hooks k, hinged to the said bar, and which hook into staples l attached to the said side casings, B. Several notches, j, are formed in the rear ends of the side casings, B, to receive the cross-bar i, so that a greater or less inclination can be given to the lower shoe, f, by adjusting the cross-bar i from one to another of the notches j.

m are the riddles, two or more of which may be used, and which are inserted in grooves in the inner surfaces of the sides of the upper shoe, G, where they are secured in place by pins n. The meshes of the riddles m are of such a size as to take out the straw and other coarse impurities, while allowing all the grain and seeds to pass through, the said riddles spreading the grain, so that the air-blast can remove all the chaff and other light impurities. The straw and chaff fall at the rear end of the machine.

In grooves in the inner surfaces of the sides of the lower shoe, f, are placed five screens, 1 2 3 4 5, the upper screen, 1, being the coarsest, and the others increasing in fineness in regular order. The screens 1 2 3 4 5 are secured in place in the shoe f by pins o. All the grain and seeds from the riddles m fall upon the upper screen, 1, and all pass through it except the largest and plumpest kernels of wheat, which kernels slide down the screen 1 to its end or foot board, where they strike against the inclined guide p, attached to the said end board, and are guided to the right-hand corner of the machine, where they fall to the floor or into some suitable receiver. The smaller kernels of wheat and the grass-seeds from screen 1 fall upon screen 2, through which the grass-seeds, cheat, cockle, and split kernels of wheat pass. The smaller kernels of wheat slide down screen 2 to its foot-board, where they strike against the inclined guide 9, by which they are guided to the left-hand corner of the machine, and fall from the said foot-board to the floor or into a receiver. The wheat is thus separated into two grades. The grass-seeds pass though screen 3; but the cheat, cockle, and split kernels of wheat slide down screen 3 to its foot-board, where they strike against an inclined guide, 19, and are guided to and escape through an aperture, r, in the foot-board of the screen, and apertures s and 20 in the foot-board of screen 4 and in the bottom of the shoe f, being prevented from passing any lower by a stop-board, t, attached to the shoe f. The timothy-seed and the red-top seed pass through the screen 4, but the red-clover seeds pass down the said screen to its foot-board, where they strike against an inclined guide, u, and are guided to an aperture, v, in the left-hand corner of the said foot-board, through which and through an aperture, w, in the bottom of the shoe they pass out, being kept from passing down any farther by the stop-board t. The red-top seed passes through screen 5; but the timothy-seed passes down the said screen 5 to its foot-board, where it strikes an inclined guide, x, and is guided to an aperture, y, in the right-hand corner of the said foot-board, through which and through an aperture, z, in the bottom of the shoe f it passes out, being kept from passing down any lower by a stop-board, 6, attached to the shoe f. The red-top seed passes down the bottom of the shoe f, and is guided by an inclined guide, 7, to an aperture, 8, in the bottom of the shoe f, through which it passes out, the said seed being prevented from passing down any farther by the stop-board 6. The seeds from the apertures 20 w z 8 may be allowed to fall into drawers or other receivers placed beneath the machine. When the machine is used for separating oats for seed, screens 2 and 3 are withdrawn, and the division-board 9 is inserted in the grooves for screen 2. Then, when the machine is operated, the larger kernels of oats pass down the screen 1, and are guided by the inclined guide p to the right-hand forward corner of the machine, where they pass out. The smaller kernels of oats pass down the division-board 9, and are guided, by the inclined guide 10, attached to the lower part of the said board 9, to the left-hand forward corner of the machine, where they pass out.

11 and 12 are two boards attached along their middle parts, by staples or rivets, to two shafts, 13 14, which pass through the side casings, B, of the machine, and have handles 15 16 attached to their projecting ends, so that the boards 11 12 can be adjusted to direct the air-blast from the fans Q in any desired direction by adjusting the shafts 13 14. The shafts 13 14 and the boards 11 12 are secured in place, when adjusted, by bolts 17, which work in keepers attached to the side casings, B, and engage with recesses formed in the sides of the projecting ends of the said shafts 13 14.

To the inner surfaces of the side casings, B, a little above the sides of the lower shoe, f, are attached the upper edges of sheet-metal plates, 18, the lower parts of which are bent inward, as shown in Fig. 2, so as to cover the spaces between the shoe f and the side casings, B, and thus prevent any grain or seed from entering the said spaces as it falls from the riddles m.

Having thus fully described my invention, I claim as new and desire to secure by Letters Patent—

1. The combination, in a cleaner and separator, with the shoe $f$, supported on springs at the upper end, of the shaft $d$, rollers $e$, and screws $g$, as and for the purpose specified.

2. The combination, with lower shoe, $f$, of the two springs $h$, the adjustable cross-bar $i$, and the notched casings B, as and for the purpose specified.

3. In a cleaner and separator for grain and grass-seeds, the combination, with the vertically-vibrating shoe $f$, carrying the screens 1 2 3 4 5, and the notched rear ends of the side casings, B, of the springs $h$ and the adjustable supporting-bar $i$, substantially as herein shown and described, whereby the inclination of the screens can be regulated and the shoe allowed to vibrate freely, as set forth.

OWEN DAVIS.

Witnesses:
THOMAS J. WOLFE,
P. R. JENKINS.